United States Patent

[11] 3,621,266

[72] Inventors Tomohiko Akuta;
   Yoshio Honsyo; Shinya Hashirizaki, all of Kitakyushu, Japan
[21] Appl. No. 877,767
[22] Filed Nov. 18, 1969
[45] Patented Nov. 16, 1971
[73] Assignee Yawata Iron & Steel Co. Ltd.
   Tokyo, Japan
[32] Priority Nov. 18, 1968
[33] Japan
[31] 43/84335

[54] METHOD AND APPARATUS FOR MEASURING THE LENGTHS OF OBJECTS BEING CONVEYED
4 Claims, 9 Drawing Figs.

[52] U.S. Cl..................................................... 250/219,
   250/223, 356/167
[51] Int. Cl...................................................... G01b 7/04
[50] Field of Search............................................ 250/219,
   223; 356/156, 141, 152, 167

[56] References Cited
UNITED STATES PATENTS
2,994,784  8/1961  White et al. .................. 250/219
3,396,278  8/1968  Hjorth.......................... 250/219

Primary Examiner—Walter Stolwein
Attorney—Wenderoth, Lind & Ponack

ABSTRACT: A method and an apparatus for carrying out the said method, by means of which an actual length of an object being conveyed can be accurately measured, even when the object is conveyed in an oblique state with such a continuous conveying equipment as a belt conveyor and the like.

INVENTOR
Tomohiko Akuta
Yoshio Honsyō
Sinya Hashirizaki

BY *Wenderoth, Lind & Ponack*

ATTORNEY

INVENTOR
Tomohiko Akuta
Yoshio Honsyō
Sinya Hashirizaki

METHOD AND APPARATUS FOR MEASURING THE LENGTHS OF OBJECTS BEING CONVEYED

BACKGROUND OF THE INVENTION

1. Field of the Invention

This invention relates to a method and apparatus for measuring the lengths of such objects being conveyed with continuous conveying equipment as a belt conveyor as, for example, objects or steel slabs.

Generally an object being conveyed with such conveying equipment as a belt conveyor or roller conveyor is rarely conveyed, while keeping an accurate angle to its conveying axis, but rather is conveyed at an angle different to the conveying axis due to various factors. Such phenomenon is called an oblique advance. If an object is only to be conveyed, such oblique advance presents no problems. But, in case the object is rectangular and its dimension or particularly its longitudinal dimension is to be known during its conveyance, if it obliquely advances, there will be measured a value longer than the actual longitudinal length of the object. This valve includes an error based on the oblique advance, when using a length-measuring device set in series on the conveying axis. Therefore, it is necessary to measure such error for the correction thereof.

In the past, correction of such oblique advance has been attempted by providing side guides or the like so that the object being conveyed may be kept parallel with the conveying axis. However, if it is to be accurately corrected, side guides will result in the conveying speed of the object being obstructed, and some oblique advance will still occur in an actual arrangement.

2. Description of the Prior Art

There have been already disclosed various inventions for automatically measuring the length of an object being obliquely conveyed. For instance, the method published in the Official Bulletin of Japanese Patent Publication No. 14903/1968 is known as a method for correcting the measurement error based on the oblique advance of an object being conveyed for obtaining its actual length.

The said invention published in the Official Bulletin of Japanese Patent Publication No. 14903/1968 has been developed as a method for measuring mainly the length of slabs, wherein a light from an object to be measured is detected by a scanning signal through slits or orifices made at fixed intervals by a plurality of photoelectric elements arranged in longitudinal rows to the object to be measured and the amount of voltage impressed on the photoelectric elements is counted to measure the length of the object, while switching and scanning in turn. The plurality of photoelectric element groups are arranged in a plurality of rows at a fixed spacing and a slab length actually measured by the photoelectric element group is corrected by the ratio of the spacing of these photoelectric element groups to the distance connecting the points at which the end edge of the object to be measured intersects the photoelectric element groups to determine thereby the length of the obliquely advancing slab. Consequently, a considerably complicated computing apparatus based on the information obtained from the photoelectric elements is required, and the time required for such computation is considerably long. Therefore said method is not adapted to the measurement of the dimensions of such objects as will pass at a comparatively high speed.

SUMMARY OF THE INVENTION

The inventors of the present invention have developed on a method wherein a positive measurement can be made at a high speed with a simple apparatus.

That is to say, the inventors of the present invention have invented a method and apparatus for measuring the lengths of objects being conveyed, which are likely to advance obliquely, by detecting the length of the part of the object along the conveyance axis of the object by means of elements along such axis for detecting the front edge and rear edge of the object. Simultaneously, a correction due to the oblique advance of the object is obtained by means of detecting elements for measuring the oblique advance angle of the object. Open angles set on various open angle lines are made respective oblique advance angles, with respect to an orthogonal line passing through the said element for detecting the front edge of the object. The detected value of the length and the detected correction are combined to obtain the actual length of the object.

The particulars of the invention shall be explained in the following with reference to the drawings.

DESCRIPTION OF THE PREFERRED EMBODIMENTS

Figure 1:
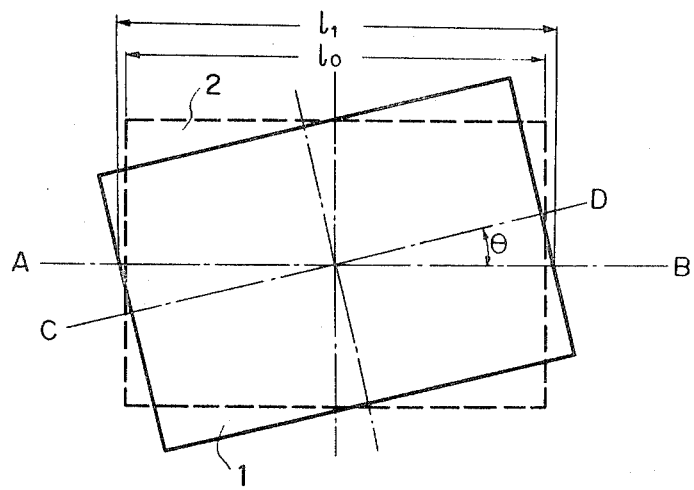
FIG. 1 is a view illustrating the obliquely advancing state of an object to be measured in accordance with the present invention.

In FIG. 1, the line A–B represents a conveying axis for an object 1 to be conveyed and measured, and the line C–D represents the actual longitudinal axis of the obliquely advancing object 1. 2 illustrates the object as it would appear if conveyed nonobliquely to the conveying axis A–B.

As is seen from FIG. 1, when attempting to measure the actual length of an object, a length parallel with the conveying axis A–B is actually measured. Therefore, the length obtained from such measurement, that is, the actually measured length $l_1$, is not the actual length $l_0$ of the object 1 but includes an error $\epsilon$ based on the oblique advance. Consequently, in order to know the actual length $l_0$, it is necessary to first measure the error $\epsilon$ and then compute $l_1 - \epsilon = l_0$ (I).

In FIG. 1, if the angle made by the axis C–D of the object with the conveying axis A–B, that is, the oblique advance angle, is made $\theta$, the above-mentioned error $\epsilon$ can be represented by $\epsilon = l_1(1-\cos\theta)$ (II).

The invention in the above-mentioned Official Bulletin of Japanese Patent Publication No. 14903/1968 relates to a method, wherein the error $\epsilon$ is not determined but $l_1 \cos\theta = l_0$ (III)

is directly computed each time to determine the actual length $l_0$. However, according to such idea as is expressed in the formula (III), a considerably complicated computing apparatus is indispensably required and the computer must become a more complicated and delicate construction for a high-speed computation, if an object is to be measured at a high speed.

As a result of studies to overcome such difficulties, the inventors of the present invention have discovered that, when the fluctuation or so-called unevenness in the length of the object is very little and the oblique advance angle is small, the above described formula (II) may be considered to be as follows:

$\epsilon = l_1(1-\cos\theta) = (l_s + \Delta l_s)(1-\cos\theta)$
$\epsilon = l_s(1-\cos\theta) + \Delta l_s(1-\cos\theta)$
$\epsilon \doteq l_s(1-\cos\theta)$ (IV), when the standard length of the object 1, that is a nominal length, set in advance on the basis of a production plan, is made $l_s$ and its fluctuation value is made $\Delta l_s$.

That is to say, the inventors of the present invention have discovered that, even if the value of $\Delta l_s(1-\cos.\theta)$ is neglected, there is no significant effect on the actual measurement. In such idea, even if the standard length $l_s$ varies with each standard of the object, it may be handled as a constant in one lot of the production. Therefore, in the actual measurement, the error $\epsilon$ can be determined as a function, which has the standard length $l_s$ as a constant and only the oblique advance angle $\theta$ as a variable.

That is to say, if there is only one variable, a set value corresponding to the variable can be selected and the computation can be omitted. The inventors of the present invention have also discovered that in this case it is necessary and sufficient in the actual operation, if the error $\epsilon$ be known as a progression having a given disparity on the basis of a specific unit length $\epsilon_o$ (which shall be referred to as a standard correction), which can be previously determined from the allowable value of error in the dimensions of the object, the precision of the measuring device and the widths of the deviations from the standard length. This point shall be later referred to in more detail.

The above described error $\epsilon$ is a value to be used to correct the actually measured length. Therefore, it shall be referred to hereinafter as a correction $\epsilon$.

If the actually measured length $l_{10}$ of the object 1 is 1,000 mm. and the measurement is made at a precision of $\pm 0.1$ percent, the actual length $l_0$ is 999 to 1,000 mm. In case the object advances obliquely and the oblique advance angle is 1°, the correction $\epsilon$ is about 0.15 mm. according to the formula (IV). In this case, with whatever precision the correction $\epsilon$ might be determined, no practical significance will be found in the difference of the correction based thereon. In the case of the dimension allowance being more than 1 mm., only when the correction $\epsilon$ reaches 1 mm. need the correction be carried out, and then, when an object, wherein the oblique advance angle $\theta$ is large and the correction $\epsilon$ reaches 2 mm., the correction of 2 mm. may be carried out. In this case no correction of the intermediate value between the correction of 1 mm. and 2 mm. is required. However, this is, indeed, and example of a situation wherein this much dimensional error is admitted. When a higher measuring precision is required, it is, of course, necessary to make the above-mentioned standard correction $\epsilon_0$ small and to determine the correction $\epsilon$ as a progression having a slight disparity.

Accordingly there is no need of determining the correction by computation for each measurement, but there can be determined by means of a simple manual computation the oblique angle $\theta$ corresponding to the correction $\epsilon$ in turn until the maximum oblique advance angle of the object, including the steps of determining the value of the standard correction $\epsilon_o$ in advance from the standard length $l_s$, the allowable error of the dimension and the deviation from the actual length, computing an oblique advance angle $\theta_1$ corresponding to the said standard correction $\epsilon_0$, and then determining an oblique advance angle $\theta_2$ corresponding to the sum of correction $\epsilon_0$ and the standard correction $\Delta\epsilon_o$, that is, $2\epsilon_o$ and so on. Therefore, it is evident that, if a detecting terminal is set at each of the thus determined oblique advance angles $\theta_1$, $\theta_2$, $\theta_n$, the correction $\epsilon$ need not be determined by computation each time, and the computation of the formula (I) can be directly made by knowing only the actually measured length $l_1$.

Figure 2:
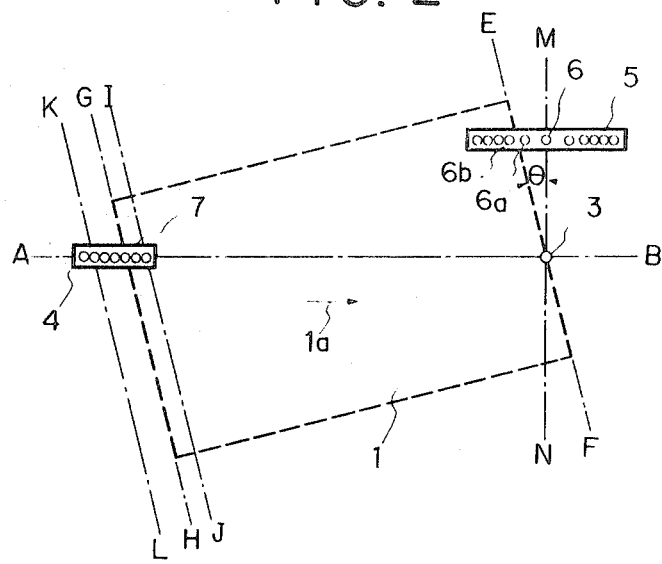
FIG. 2 is a schematic view illustrating the measurement of the length of the object according to the present invention.

The said correction $\epsilon$ can be more easily applied to the actual device, when it is determined as a numerical value of an arithmetical progression, so far the standard correction $\epsilon_o$ is determined. That is, it is clear from the above-mentioned formula (IV) that the oblique advance angle $\theta_1$ corresponding to the standard correction $\epsilon_0$ can be determined from the formula $\epsilon_0=l_s(1-\cos\theta_1)$. Then, the correction $\epsilon$ is sectioned as $2\epsilon_0=l_s(1-\cos\theta_2)$,
$3\epsilon_0=l_s(1-\cos\theta_3)$,
$\vdots$
$n\epsilon_0=l_s(1-\cos\theta_n)$ in turn, and $\theta_2$, $\theta_3$, $\theta_n$ respectively are determined. FIG. 2 shows an example, in which the above-mentioned idea has practically been applied.

In FIG. 2, 1 is an object to be measured which is to be conveyed parallelly along the conveying axis A–B in the direction indicated by the arrow 1a,3 is a photoelectric element which shall be referred to as an S-element hereinafter) for detecting the front edge of the object to be measured, and 4 is a photoelectric element group (which shall be referred to as an R-element group) for detecting the rear edge of the object to be measured and including a plurality of photoelectric elements arranged at equal intervals. The S-element 3 and R-element group 4 are set at a spacing determined from the standard length $l_s$ along the conveying axis A–B. Further, 5 is a length correction value detecting photoelectric element group (which shall be referred to as a Q-element group hereinafter) made by arranging a plurality of photoelectric elements at respectively specified spacings, as will be described later. In the element group there is a correction standard element 6 which is located on an orthogonal line M–N crossing the conveying axis A–B at a right angle thereto and passing through the S-element 3. The distance of the correction standard element 6 from the S-element 3 is properly set in response to the width of the object to be measured.

Figure 7:
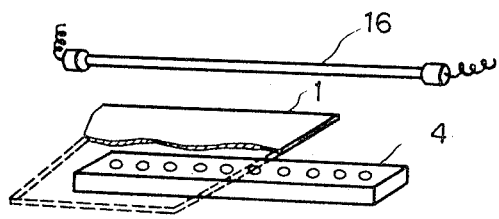
FIG. 7 is a partial perspective illustration of photoelectric elements and a light source device in accordance with the present invention.

Seven is an actually measuring standard photoelectric element in the R-element group 4. Such S-element 3, R-element group 4 and Q-element group 5 are all connected with an electric circuit so that electric signals issued therefrom may be treated as explained in detail in FIGS. 8 and 9 and may be always in an excited state by being subjected to a luminous flux from a light source 16 as shown in FIG. 7. However, if the object to be measured is so hot as to emit radiated rays, the purpose can likewise be attained by using only such photoelectric element as generates a voltage by said radiated rays, even without providing the light source 16.

In the apparatus shown in FIG. 2, when the object 1 is conveyed, whereby the light to the S-element 3 is intercepted, the actually measured length $l_1$ becomes equal to the standard length $l_s$, because the distance between the S-element 3 and the element 7 is made equal to the standard length $l_s$, assuming that the rear end of the object 1 on the R-element group 4 coincides with the line segment G–H and intercepts the element 7. Now, the front edge of the object 1 coincides with the line segment E–F. It is evident from a geometrical theorem that the angle $\theta$ made by the line segments E–F and M–M–N is exactly equal to the oblique advance angle $\theta$ in FIG. 1. Therefore, if it is known to what element of the Q-element group 5 the light is intercepted by the front edge of the object 1, the oblique advance angle $\theta$ can substantially be known. In this case, since each element is arranged on a predetermined oblique advance angle, the correction corresponding to each element may be readily known, and the actual length $l_o$ can be directly determined from the above-mentioned actually measured length $l_1$, as will be described later.

It is self-evident that, when object 1 is shorter or longer than the standard length $l_s$, its rear end coincides, for example, with the line segment I–J or with the line segment K–L, respectively.

Further, the Q-element group 5 shall be described more particularly.

Figure 3:
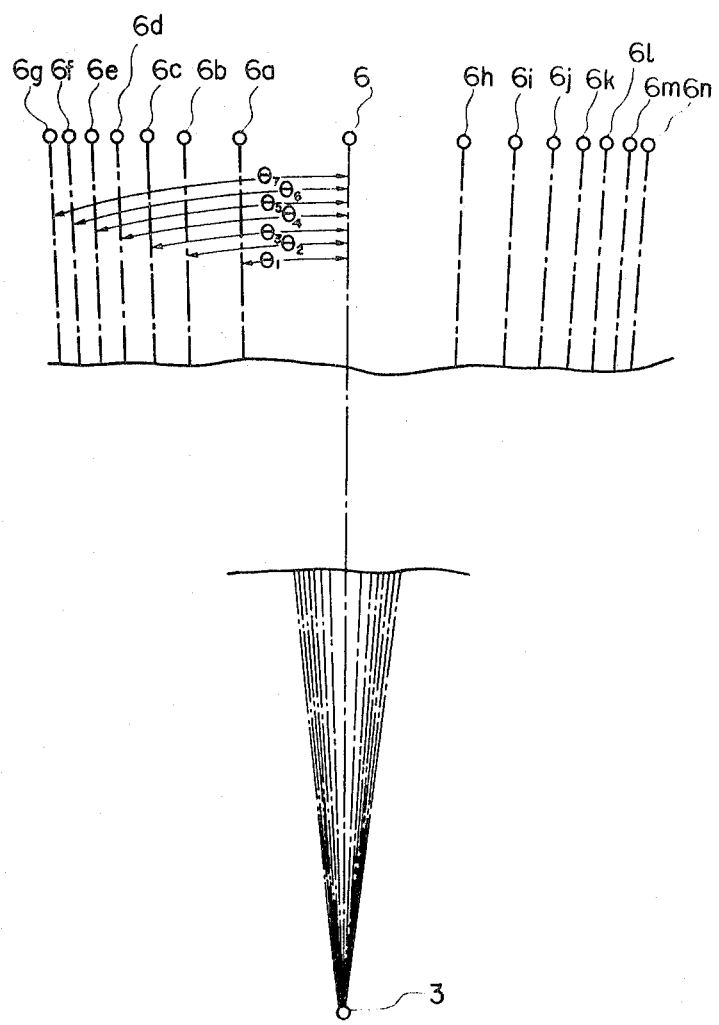
FIG. 3 is a schematic illustration of an arrangement of a photoelectric element group for detecting a length-correcting value to be used in the method of the present invention.

FIG. 3 shows an arrangement of the Q-element group 5. As described above, the S-element 3 and the correction standard element 6 are positioned in a direction at a right angle to the conveying axis. The first photoelectric element 6a to the left of the correction standard element 6 in the drawing is arranged in a position to indicate an oblique advance angle $\theta_1$ which satisfies the formula $\epsilon_0=l_s(1-\cos\theta_1)$, that is, on an open angle line having an angle $\theta_1$ on the left side in the drawing, while making the straight line connecting the S-element 3 and correction standard element 6 the basic line, after setting the above-described standard correction $\epsilon_0$. Thus, the photoelectric element 6b is positioned on the open angle line corresponding to the oblique advance angle $\theta_2$ and the photoelectric elements 6c, 6d, 6e, 6f and 6g are positioned on the open angle lines corresponding respectively to the oblique advance angles $\theta_3$, $\theta_4$, $\theta_5$, $\theta_6$ and $\theta_7$.

Further, as the oblique advance occurs in the same manner to the right and left of the basic line, the Q-element group 5 is symmetrical to the right and left with the correction standard element as a center. In FIG. 3, the photoelectric element 6h lies in the position corresponding to the photoelectric element 6a, and the photoelectric elements 6to 6m are positioned to correspond to elements 6b and 6g.

Figure 4:
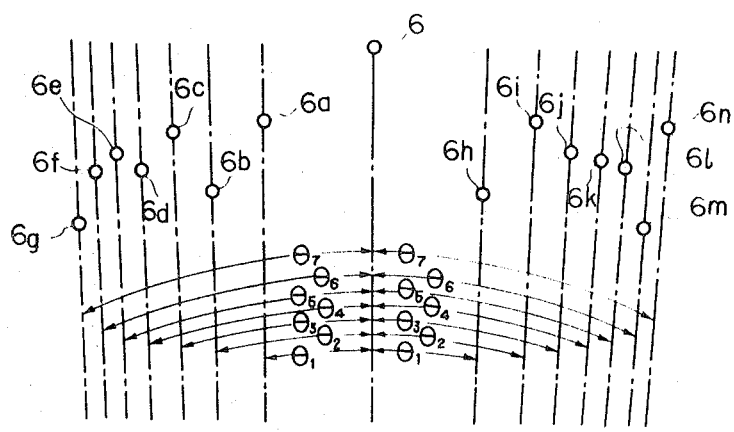
FIG. 4 is a schematic illustration of another arrangement of a photoelectric element group for detecting a length-correcting value.

As the photoelectric elements in the Q-element group 5 are arranged on the basis of the oblique advance angles, they are not always required to be arranged parallel with the conveying axis, as shown in FIG. 3. As is shown in FIG. 4, so long as the elements are positioned on the open angle lines keeping the oblique advance angles $\theta$, their arrangement can be freely determined for convenience of measurement.

Figure 5:
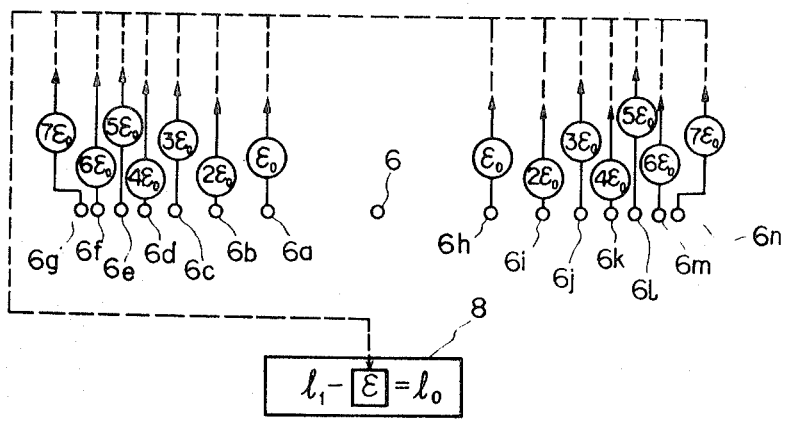
FIG. 5 is a schematic view illustrating the correction computation in accordance with the present invention.

It shall be further explained that, if the Q-element group 5 is thus arranged, the computing mechanism can thereby be simplified. And, if the electric signals obtained by the respective photoelectric elements are so determined in advance as to correspond to the corrections, for instance, as shown in FIG. 5, the standard correction $\epsilon_0$ may be obtained from the photoelectric element 6a or 6h. Then a value twice as large as the standard correction $\epsilon_0$ may be obtained from the photoelectric elements 6b or 6i. The actual length $l_0$ can be quickly computed, as the correction $\epsilon$ is directly available in a simple computing mechanism 8 as shown in FIG. 5, by using the actually measured length $l_1$ as described above.

Figure 6:
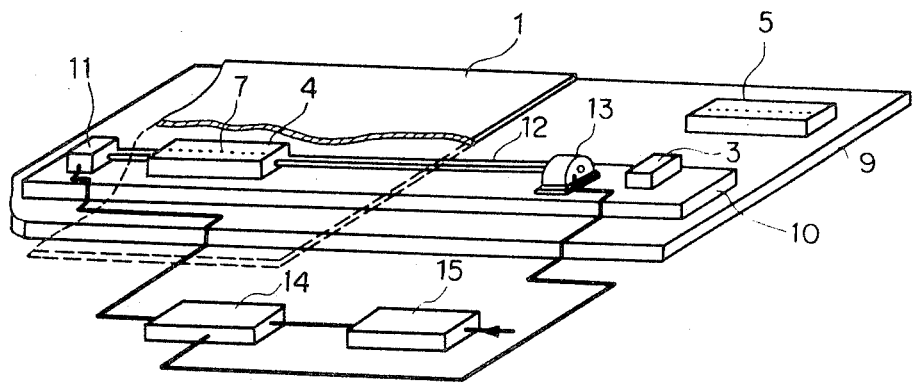
FIG. 6 is a schematic perspective view of an apparatus comprising an embodiment of the present invention.

Further, in FIG. 6 showing an arrangement of an embodiment of the present invention, that is, showing an example of setting a measuring device to a standard length (nominal length of product), wherein 1 is a object to be conveyed, a fixed base 10 is secured on a supporting floor 9, and on this fixed base there are positioned an S-element 3, an R-element group 4 and a measured length value transmitter 11 to detect the distance between the S-element 3 and the actual measuring standard photoelectric element 7 in the R-element group 4. Also provided is a driving motor 13 for moving the position of the R-element group 4 and a driving shaft 12 connected to the motor. There is also a Q-element group 5 on the supporting floor 9. Further, there is provided a standard length setter 15 and a difference detector 14 to detect the difference between the standard length and the distance between the S-element 3 and the element 7 and to issue a correcting signal of such difference, if any.

In such apparatus, the difference detector 14 functions to compare the instruction relating to the standard length from the standard length setter 15 and the measured length value signal from the measured length value transmitter 11 and transmit such correcting electric signal as makes the difference zero to the driving motor 13. Accordingly, the driving motor 13 rotates so that the distance between the element 7 in the R-element group 4 and the S-element 3 may be made to coincide with the predetermined standard length by the driving shaft 12. As described above, the S-element 3, R-element group 4 and Q-element group 5 are always illuminated with the light source 16, and the object 1 is conveyed so as to intercept the light received by the photoelectric elements. Needless to say, depending on the influence of the external light and the object conveying mechanism, it can be freely determined within a range not deviating from the object of the present invention to reverse the positions of the photoelectric element group 4 and light source 16 shown in FIG. 7 or to provide a mechanism for simultaneously moving the light source 16 and photoelectric element group 4, In the apparatus in FIG. 6, if the object 1 is conveyed from the left to the right, the light to the photoelectric element is intercepted by the object 1, as is explained in detail with reference to FIG. 2, and an electric signal obtained thereby is transmitted to an electric circuit, as will be explained in FIGS. 8 and 9, so that the length and oblique advance correcting value may be detected. This embodiment is of a structure wherein the distance between the S-element 3 and R-element group 4 is varied each time the standard length $l_a$ varies. However, this is an example in which there is such need. The present invention is not limited to such an embodiment, but can also be of a structure wherein a plurality of R-element groups 4 are arranged along the measuring line each time the standard length $l_s$ is different and a plurality of corresponding Q-element groups 5 are provided so that, even in case objects to be measured, which are different in the standard length $l_s$, are alternately conveyed, the lengths can be easily measured by switching over the electric circuit.

Further, if the length measuring method according to the present invention is combined, for example, with a shearing machine for the above described object, it is possible to improve the shearing precision by feeding the obtained actual length value of the object back to the shearing machine.

Figure 8:
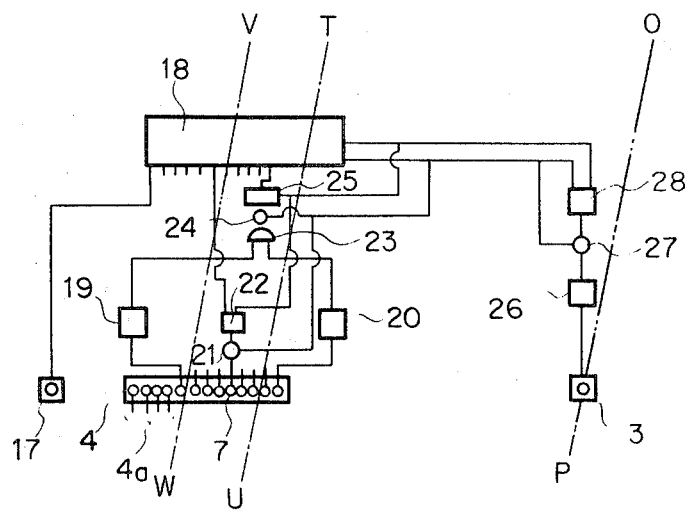
FIG. 8 is a view for explaining a measuring circuit in accordance with the present invention.

In FIG. 8 which for particularly illustrates the actual measured length electric circuit in the present invention, 3 is an S-element, 4 is an R-element group in which photoelectric elements are arranged at equal intervals and 7 is an actual measuring standard photoelectric element. 17 is a reset photoelectric element which is positioned in front of the R-element group 4 in the conveying direction so as to release the set state of the measuring circuit accompanying the preceding measurement and is operated by a signal of the light being intercepted by the object in the same manner as the other elements. 18 is a part of the general control treatment which can function to receive electric signals from the S-element 3 and R-element group 4, indicate the actual length of the object by a simple electric circuit construction, and at the same time transmit the actual length to the indicator and further to the recorder, compare the actual length with the standard length desired and issue a setting-correcting instruction for the shearing machine and operating an alarm in case the correction is excessively large.

Nos. 19, 20 and 26 are amplifiers for electric signals of the photoelectric elements. Nos. 22, 25 and 28 are so-called flip-flop elements which send signals to a different circuit than before when they receive a specific signal. Nos. 21, 24 and 27 are gate circuits which are closed only when there is a specific signal. No. 23 is an AND circuit which is closed only when there are electric signals in all the circuits. The R-element group 4 consists of respective four actual measured length detecting photoelectric elements symmetrically arranged to each of the right and left of the actual measured photoelectric element 7 as a center, as shown in the drawing, with the addition of an excess length measuring photoelectric element group 4a.

The amplifier 19, flip-flop element 25 and AND-circuit 23 should be properly shown as groups, but in FIG. 8 they are illustrated for only one circuit for convenience of the explanation.

In such apparatus, when the front edge of the object reaches the position where light to the S-element 3 is intercepted thereby, that is, the position of the line segment O–P, the signal passes through the amplifier 26 and gate circuit 27 to operate the flip-flop element 28 and is transmitted to the general control treatment part 18 and at the same time closes the gate circuits 21 and 24. Therefore, in this case, four photoelectric elements on the left hand and two photoelectric elements on the right hand from the actually measuring standard photoelectric element 7 as a center in the drawing will not be intercepted from the light, assuming that the rear edge of the object is lying in the position of the line segment T–U. Consequently, the signals corresponding to the residual two, that is, to the two intercepted photoelectric elements at the extreme right end are indicated as inoperative. Because of the actual measuring standard photoelectric element 7 being not intercepted, the general control treatment part 18 operates to subtract its value, that is, the correction, from the standard length which is, in this case the distance between the S-element 3 and standard photoelectric element 7. Likewise, in case the rear edge of the object is on the line segment V–W, only one photoelectric element at the extreme left end will not be intercepted. Consequently, one flip-flop element becomes inoperative, but three operate. In this case, as the actual measuring standard photoelectric element 7 is intercepted, it is informed to the general control treatment part 18 that its value should be added to the standard length, whereby the actual measured length is determined. Further, in case the object is longer than the deviation from the standard length, this case corresponding, for instance, to that of an error being produced by the oblique advance of the object, the excess length measuring photoelectric element 4a will be intercepted from the light, whereby all the corresponding flip-flop elements 25 are actuated, because all other photoelectric elements of the R-element group are intercepted from the light. Therefore, the signal from the excess length measuring photoelectric element group 4a need not be passed through the AND circuit, but may be transmitted from the amplifier directly to the flip-flop element 25.

Thus, the actual measured length is determined. However, in order to further know the actual length, this actual measured length must be corrected in the manner as above-mentioned.

Figure 9:
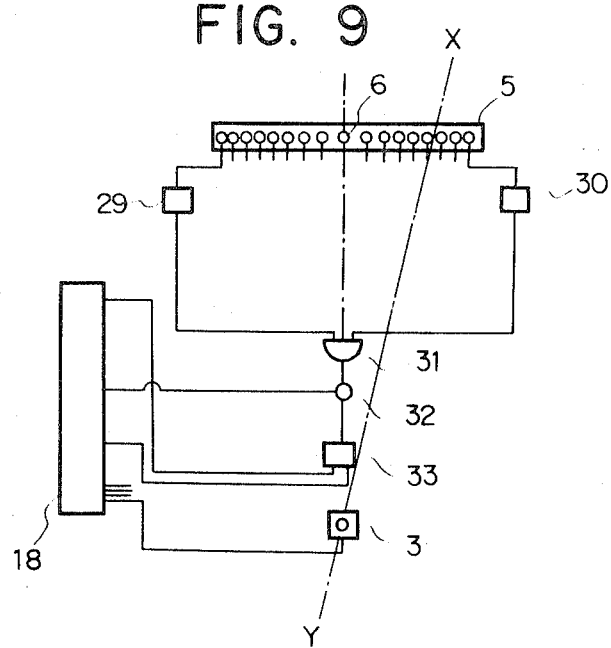
FIG. 9 is a view for explaining a correction measuring circuit in accordance with the present invention.

In FIG. 9 showing the details of a correction measuring circuit, 3 is an S-element, 5 is a Q-element group, 6 is a correcting standard element, 18 is the general control treatment part, 29 and 30 are amplifiers, 31 is an AND circuit, 32 is a gate circuit and 33 is a flip-flop element. Now, if the front edge of a object comes to the position of the line segment X–Y, the S-element 3 is intercepted from the light, whereby the gate circuit 32 is closed and the five photoelectric elements as counted from the correcting standard element 6 in the drawing are intercepted from the light. Consequently, five of the flip-flop elements 33 are actuated by the signals, and the correction shows a value 5 times as large as the standard correction $\epsilon_o$, if it is so designed as is shown in FIG. 5, the signal of which being immediately received by the general control treatment part 18 are an instruction to subtract the correction of $5\epsilon_o$ from the above described actual measured length. The construction of the photo electric elements may be such that the light may be directly received by such photosensitive element as a photoelectric tube, photoelectric amplifying tube or phototransistor according to the required measurement precision. Further, for the purpose of obtaining a higher precision, optical fibers, avoiding the direct reception of the light, can be recommended as effective to attain the object of the present invention.

It should be understood that the present invention is not limited to the specifically illustrated embodiments and that it is within the technical scope of the present invention to add, as required, a recorder, alarming device and control transmitting device for another step by using the dimension obtained by the present invention as an information source. Further, it should be known to be a feature of the present invention that, in the actual design, many photoelectric elements of the above-described Q-element group 5 are arranged at equal intervals so that adapted photoelectric elements may be respectively selected each time the standard length varies on the basis of the standard corrections amounts and oblique advance angles corresponding to said each variation of the standard length and further the arrangements can be freely combined.

As described above, according to the present invention the actual length of an object being conveyed can be measured positively and quickly by using a simple electric circuit. Therefore, the present invention is vary useful to improve the quality of the product and can be utilized extensively in any industry.

What is claimed is:

1. A method for measuring the actual length of an object being conveyed along a conveying axis and which is likely to advance obliquely, said method comprising the steps of detecting the front edge of said object along said conveying axis by causing said front edge to actuate a photoelectric element, thereby producing a first signal; simultaneously detecting the rear edge of said object along said conveying axis by causing said rear edge to actuate one or more photoelectric elements of a first group, thereby producing a second signal; combining said first and second signals to produce a third signal indicative of the measured length of said object along said conveying axis; simultaneously causing the front oblique edge of said object laterally spaced from said conveying axis to actuate one or more photoelectric elements of a second group positioned to form predetermined angles with an orthogonal line passing through said photoelectric element, thereby producing a fourth signal indicative of a length correction due to the oblique advancement of said object; and deducting said fourth signal from said third signal to obtain a fifth signal indicating said actual length of said object.

2. An apparatus for measuring the actual length of an object being conveyed by a conveyor along a conveying axis and which is likely to advance obliquely, said apparatus comprising a photoelectric element positioned with respect to said conveyor to be actuated by the front edge of said object at said conveying axis and to thereby produce a first signal; a first group of photoelectric elements positioned with respect to said conveyor such that one or more of said first group of photoelectric elements are actuated by the rear edge of said object at said conveying axis simultaneously with the actuation of said photoelectric element and to thereby produce a second signal; means operable in response to said first and second signals to produce a third signal indicating the measured length of said object extending along said conveying axis; a second group of photoelectric elements laterally spaced from said conveying axis such that one or more of said second group of photoelectric elements are actuated by the front oblique edge of said object simultaneously with the actuation of said photoelectric element and said first group of photoelectric elements to thereby produce a fourth signal, a first element of said second group being positioned such that a line therethrough from said photoelectric element is orthogonal to said conveying axis, the remainder of said elements of said second group being spaced such that lines therethrough from said photoelectric element form predetermined angles with said orthogonal line, said predetermined angles corresponding to various oblique advance angles of said object, said fourth signal indicating a length correction caused by the oblique advancement of said object; and means responsive to said third and fourth signals to combine said third and fourth signals to produce a fifth signal indicating said actual length of said object.

3. An apparatus as claimed in claim 2, wherein said remainder of elements of said second group are symmetrically arranged on either side of said orthogonal line.

4. An apparatus as claimed in claim 2, further comprising a plurality of said first groups of photoelectric elements, a corresponding plurality of said second groups of photoelectric elements, and means for switching from among said plurality of groups, whereby objects of varying lengths may be accomodated.

* * * * *